INVENTOR.
Marion E. Hines
BY
Alfred C. Hoesen
Attorney

July 20, 1965 M. E. HINES 3,196,356

ELECTRIC WAVE FREQUENCY CONVERTERS

Filed April 14, 1961 3 Sheets-Sheet 2

INVENTOR.

Marion E. Hines

BY Alfred H. Rosen

Attorney

July 20, 1965 M. E. HINES 3,196,356

ELECTRIC WAVE FREQUENCY CONVERTERS

Filed April 14, 1961 3 Sheets-Sheet 3

INVENTOR.
Marion E. Hines
BY
Alfred H. Rosen
Attorney 3,196,356

ELECTRIC WAVE FREQUENCY CONVERTERS

Marion E. Hines, 116 Meadowbrook Road, Weston, Mass.

Filed Apr. 14, 1961, Ser. No. 103,166
5 Claims. (Cl. 325—445)

This invention relates to electric wave frequency-converting circuits and systems, and more particularly to the simplification and improvement of those utilizing negative-resistance nonlinear resistance devices.

Frequency-converting circuits are used to transform the frequency range of a message or signal wave from one band of frequencies to another in order to modulate a radio frequency wave for radio transmission, or to shift the frequency range from the radio frequency band to an intermediate frequency range where it may be more easily amplified. For example, in receivers for radar equipment, the wave received by the antenna may be at some ultrahigh frequency such as 3000 mc. It is common in such receivers to use a frequency-converting circuit to transform the received wave to an intermediate frequency range such as 60 mc. where it may be easily amplified by a multistage vacuum tube or transistor IF amplifier. Such frequency-converting circuits are commonly called mixers. Such circuits are also commonly used in reverse to transform a message from a low or intermediate frequency range to a high frequency range and for this function the circuits are usually called modulators.

At present, it is common practice in such circuits and systems to use a nonlinear resistance device, such as a semi-conductor diode of the rectifying type. In order to perform this function, the rectifying device must be "pumped" by an oscillating electric wave, i.e., by a local oscillator or other source of energy at suitable frequency, and frequency conversion is obtained by applying simultaneously the signal frequency and extracting therefrom the resulting output (frequency-converted) signal. In accordance with the present invention, the functions of local oscillator and nonlinear resistance device are combined by using a nonlinear resistance device having a current-versus-voltage characteristic which includes a negative resistance portion between two positive resistance portions, in an appropriate network and suitably biased, as hereinafter described. Suitable for this purpose is the so-callew "tunnel diode" of the type described by Dr. Leo Esaki in the Physical Review, vol. 109 (1958), page 603. More particularly, frequency converter circuitry is simplified according to the present invention by employing the negative resistance characteristics of such a device to produce electric wave oscillations, so that the device forms its own "pump" source, and simultaneously to employ the nonlinear resistance characteristic of such device to perform the mixing function which produces frequency conversion.

It is a general object of the invention to simplify and improve frequency converter circuits and systems. A more particular object of the invention is to provide a frequency converting circuit which requires no external local oscillator source. Another object of the invention is to provide a frequency converting circuit which employs a single negative-resistance nonlinear resistance device simultaneously as an element of a local oscillator and as an element of a frequency mixer or modulator. It is a specific object of the invention to provide the foregoing improvements in circuits and systems adapted for use throughout the useful radio frequency spectrum. To this end, it is a further object of the invention to provide the foregoing improvements in distributed constant circuit comprised of coaxial line sections, waveguide sections and cavity resonators, as well as in lumped constant circuits.

Other and further objects and features of the invention will become apparent from the following description of certain embodiments thereof. This description refers to the accompanying drawings, wherein.

Figure 1:
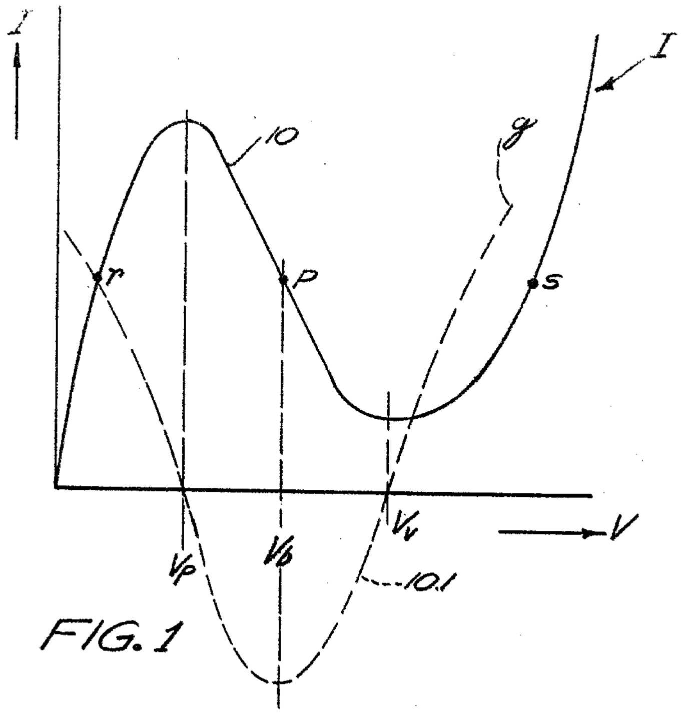
FIG. 1 shows in Cartesian coordinates the type of voltage current relationship which is provided by a tunnel, or "Esaki" diode.

Referring now to FIG. 1, the solid line curve 10 represents a current-versus-voltage characteristic (i.e., the "I–V" curve) of an Esaki or "tunnel" diode, and the dotted line curve 10.1 is the conductance-versus-voltage characteristic (i.e., the "$g$–V" curve; or "$dI/dV$ with respect to V) for the same diode. Such a diode exhibits regions of "positive resistance" for voltage values, respectively, lower than $V_p$ and higher than $V_v$, where $V_p$ and $V_v$ are points on the horizontal, or "Voltage" axis as shown in FIG. 1, and a region of "negative resistance" for the voltage values between $V_p$ and $V_v$. By the terms "positive resistance" and "negative resistance," I refer to the algebraic sign of the ratio $\Delta V/\Delta I$, where:

$\Delta V$ is an incremental change in the voltage V, and
$\Delta I$ is an incremental change in the current I, and note that the algebraic sign of this ratio is (+) for voltage values below $V_p$ and above $V_v$, and is (−) for voltage values between $V_p$ and $V_v$.

According to the present invention, a nonlinear resistance device exhibiting a region of negative resistance, as exemplified by the tunnel diode, is biased (by means to be hereinafter described; for example, an external voltage source) so that the average value of the voltage is at $V_b$ between $V_p$ and $V_v$, as shown in FIG. 1. At this bias voltage, the current I has a value, shown at point P, which is approximately midway betweeen the limits of the negative-resistance region of the I-V curve, and the conductance "$g$" is at substantially its maximum negative value. It is well known that the negative-resistance associated with this type of voltage-current relationship can result in oscillation at a resonant mode of a circuit with which such a device is associated, and, when such oscillation occurs, the voltage V will alternately swing more positive and more negative than the bias voltage value $V_b$, and may swing to a more positive value than $V_v$ and to a more negative value than $V_p$. In other words, if the device is incorporated in a circuit having a given resonance frequency ($f_p$) and if point P is established as the operating point in the absence of oscillations, oscillations at such resonance frequency ($f_p$) can occur, and will cause the voltage V to swing about the operating point ($V_b$) and, if the oscillations are of sufficient magnitude the voltage may swing into the positive-resistance regions of the I-V curve, and the current may instantaneously (and alternately) approach points "r" and "s," as shown in FIG. 1. If the voltage swing is approximately sinusoidal, the incremental conductance "g" will be negative twice each cycle, and will also be positive at the peak excursions twice each cycle. Thus, the conductance "g," as a function of time, will vary approximately sinusoidally at twice the oscillating frequency ($2f_p$). This condition is ideally suited for nonlinear frequency conversion, such that a signal at either of the frequencies ($2f_p-f_s$) or ($2f_p+f_s$), where $f_p>f_s$, will produce the lower frequency $f_s$, for down-conversion, or, vice versa, a signal at $f_s$ will produce ($2f_p-f_s$) and/or ($2f_p+f_s$) for up conversion.

Figure 2:
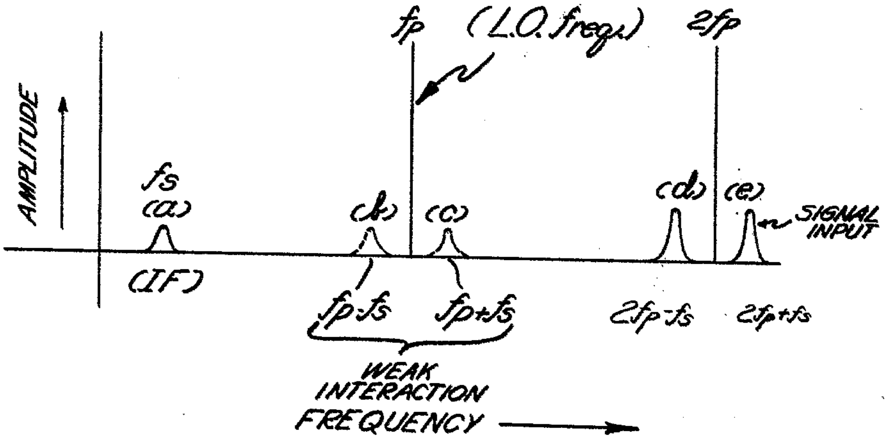
FIG. 2 illustrates the common frequency transformations which result from frequency conversion in a mixer or a modulator.

FIG. 2 illustrates the foregoing situation for down-conversion from an input signal at a frequency ($2f_p+f_s$) to an IF frequency at $f_s$, where $f_p$ is the local oscillator frequency. Also shown in FIG. 2 are the first-order conversion frequencies ($f_p-f_s$) and ($f_p+f_s$) resulting from beating $f_s$ together in an oscillator oscillating at $f_p$. For the mode of operation herein under discussion, the first-order conversion is not efficient (as will be more fully explained below); it can be made to become or approach zero by choosing point P (FIG. 1) to be at or near the center of the negative resistance region of the I-V curve (10, in FIG. 1).

For the purposes of a generalized discussion, portions of the frequency range encompassed in FIG. 2 are designated:

Band (*a*)—including $f_s$;
Band (*b*)—including ($f_p-f_s$);
Band (*c*)—including ($f_p+f_s$);
Band (*d*)—including ($2f_p-f_s$); and
Band (*e*)—including ($2f_p+f_s$).

Additional bands, not illustrated, may be envisioned as follows:

Band (*f*)—including ($3f_p-f_s$);
Band (*g*)—including ($3f_p+f_s$); and so forth.

A radio signal in any of the frequency bands, *b, c, d, e, f,* etc., may be applied to the nonlinear resistance device, and by interaction with the oscillator frequency $f_p$, a new signal can be generated in the nonlinear resistance device in the intermediate frequency band *a*. If the nonlinear resistance is highly nonlinear and is strongly driven by the local oscillator, efficient interaction can occur among many such bands. Transformations between any of these bands is possible under certain specific circumstances. Harmonics of $f_p$ will also be generated at the frequencies $2f_p$, $3f_p$, etc. Although, in general, many such frequencies can be generated, the efficiency of the various transformations among particular bands depends upon the type of nonlinear resistance used and the form of the voltage wave induced by the local oscillator. I have discovered that it is a characteristic of the Esaki, or tunnel, diode that conversion between bands *d* and *a*, or bands *e* and *a*, is particularly strong when the diode is providing its own oscillations at the frequency $f_p$. It is a particular feature of the present invention to obtain this type of interaction with a nonlinear resistance negative resistance device, as exemplified by the Esaki diode.

In accordance with the theory of nonlinear resistance mixers given by L. C. Peterson and F. B. Llewellyn in "The Performance and Measurement of Mixers in Terms of Linear Network Theory," Proceedings of the I.R.E., vol. 33, No. 7, July 1954, page 458, we may determine the strength of the frequency conversions by a Fourier analysis of the variation of the incremental conductance (or resistance) as is a function of time. When the voltage (V) is a periodic function of time at the frequency $f_p$, the incremental conductance ($\Delta/\Delta V$) must be described as a Fourier series:

$$g(t)=\ldots g_{-n}e^{-j2n\pi f_p}\ldots+g_{-2}e^{-j4\pi f_p}+g_{-1}e^{-j2\pi f_p}+g_0+g_1e^{j2\pi f_p}+g_2e^{j4\pi f_p}+g_3e^{j6\pi f_p}\ldots+g_ne^{j2n\pi f_p}\ldots$$

In this series, "$g_0$" is the average conductance, or the D.C. mean value. The coefficients "$g_{-1}$" and "$g_1$" are complex conjugates and give the magnitude of the first harmonic or fundamental variation of conductance at the frequency $f_p$. The coefficients "$g_{-2}$" and "$g_2$" are also complex conjugates, and give the magnitude of the second harmonic variation of conductance at the frequency $2f_p$, etc. As is pointed out above, the conductance of a nonlinear negative resistance device (such as an Esaki diode) having an I–V characteristic of the type illustrated by curve 10 in FIG. 1, during oscillation about an operating point in the center of the negative resistance region, will swing from negative to positive if the voltage goes sufficiently above or below such center; and if the voltage swings back and forth about that operating point with a sinusoidal wave at frequency $f_p$, the incremental conductance will be (+) twice per cycle and (−) twice per cycle. This means that the major alternating components in the above-described Fourier series are the second harmonic terms:

$$g_{-2}e^{-j4\pi f_p}\text{ and }g_2e^{j4\pi f_p}$$

Peterson and Llewellyn point out that this is most favorable for frequency conversion between the bands *a* and *d* and the bands *a* and *e*, in FIG. 2, for the frequency relationships: $2f_p-f_d=f_a$; and $f_e-2f_p=f_a$, respectively. It is a feature of this invention that these most favorable frequency transformations are utilized.

Another interesting point in the theory of Peterson and Llewellyn is that the efficiency of such transformation also depends upon the ratio of "$g_2$" to "$g_0$," where "$g_0$" is the average value of conductance. If this ratio is less than one, the signal gain can never be greater than unity, but if this ratio is greater than one, or is negative, then we can expect a gain greater than unity, which implies an increase in signal power in transformation. For devices having the characteristics illustrated in FIG. 1, such as Esaki, or tunnel, diode, negative conductance occurs part of the time, so that the average value "$g_0$" may be small or negative, and gain is possible in this case. Thus, in the present invention, the frequency conversions which are achieved can exhibit power gain. In addition, I have found such frequency conversions to be relatively noise-free, thereby enhancing sensitivity of receivers, for example.

Figure 3:
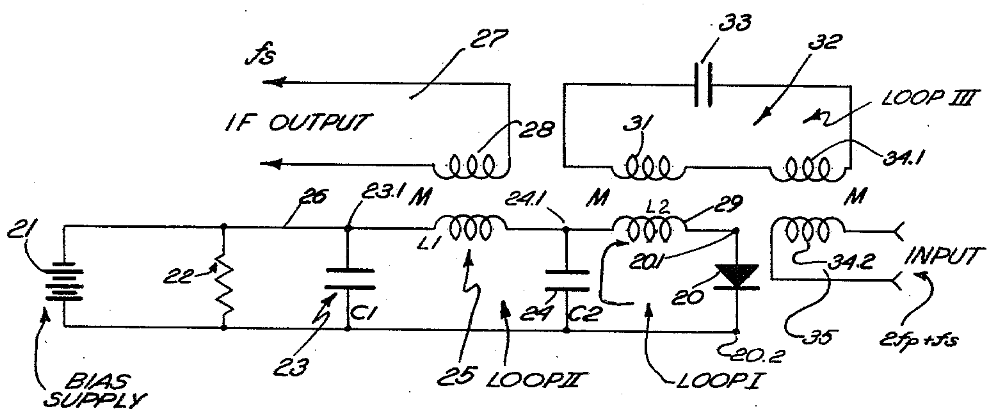
FIG. 3 is a circuit diagram of a frequency conversion system according to the invention.

In order to achieve the objects of the invention, I have provided a system which ensures that self-oscillation occurs only at the desired frequency "$f_p$," and not at other frequencies. This system embodies a network of circuit loops having a net conductance, including the nonlinear resistance negative resistance device, which is positive at all resonance frequencies possible in the system except those in the vicinity of the desired oscillation frequency, $f_p$. FIG. 3 illustrates such a system.

In FIG. 3, a tunnel diode 20, having two terminals 20.1 and 20.2, respectively, exemplifies the nonlinear resistance negative resistance devices contemplated for use in the invention. A battery 21 provides a bias voltage supply for biasing the diode at a voltage value at or near the value $V_b$ (in FIG. 1). A resistor 22 is optionally connected across the battery, and is useful in stabilizing the system if long highly inductive power leads are used with a distant battery. A first capacitor 23 (having a value of capacitance $C_1$, of the order of 10,000 $\mu\mu$f., for example), constitutes a by-pass capacitor having a low reactive impedance at all alternating frequencies of interest. A second capacitor 24 (having a smaller value of capacitance $C_2$, of the order of 100 to 300 $\mu\mu$f., for example), constitutes a circuit element in the loop containing the diode 20, as will be more fully explained below. The first and second capacitors, 23 and 24, respectively, the resistor 22, and the diode 20 are all connected in parallel across the battery 21. A first inductor 25 (having a value of inductance $L_1$ which is appropriate to resonate with the capacitance $C_2$ of the second capacitor 24 (and other circuit elements of the entire network) at the intermediate frequency $f_s$) is connected in series in one side 26 of the line from the battery 21 to the diode 20, between the junctions 23.1 and 24.1 respectively, of the first and second capacitors 23 and 24 with that side 26. The first inductor 25 is coupled to an intermediate frequency output line 27 through mutual inductance with an output inductor 28. A second inductor 29 (having a value of inductance $L_2$ which is appropriate to resonate with the combined capacitance $C_2$ of the diode 20 and of the second capacitor 24 (and other circuit elements of the entire network) at the desired frequency of local oscillation $f_p$ of the diode 20) is also connected in series in said one side 26, between the junction 24.1 of the second capacitor 24 and one terminal 20.1 of the diode 20.

The second inductor 29 is coupled through mutual inductance with an input inductor 31, which is an element of a tank circuit 32 dimensioned electrically for resonance to the input signal $(2f_p+f_s)$; this tank circuit might also be made resonant to the frequency $(2f_p-f_s)$. The input tank circuit includes a capacitor 33 and another inductor 34.1 over which by mutual inductance with a companion inductor 34.2 it is coupled to an input line 35.

Thus the diode 20 is employed in a system comprising a network having at least three loops and first, second and third resonance frequencies, $f_p$, $f_s$ and $(2f_p\pm f_s)$, where $f_p>f_s$. The first loop, labelled "Loop I" in FIG. 3, includes the diode, and it is in this loop that the negative resistance oscillations are generated. Loop I is adapted to resonate predominantly at the first frequency, $f_p$. The second loop (Loop II in FIG. 3) is adapted to resonate at the second frequency $f_s$, and the third loop (Loop III in FIG. 3) is adapted to resonate at either of the frequencies $(2f_p\pm f_s)$ as desired. To achieve these resonances, the reactive components of each loop (inductance and capacitance) are proportioned relative to the remainder of the network (as well as to each other) to establish the desired resonance frequency in such loop, as will be more fully explained below.

In accordance with the well-known principles of network analysis, the network of FIG. 3 will be capable of exhibiting a number of resonance frequencies. If one were to remove the diode 20, and substitute for it a capacitor having the same value of capacitance as the diode and measure the circuit impedance as a function of frequency across the terminals 20.1 and 20.2, one would obtain substantially the circuit impedance-versus-frequency "curve" 40, shown in FIG. 5. This curve shows only the resistive component of impedance. Near zero frequency, in the region of point 40.1, this curve shows the value of the resistor 22 in shunt with the battery 21. Near $f_s$, in the region of point 40.2, there is a resonance due to the output circuit and Loop II, of which the peak impedance value may be adjusted by varying the value of inductance of the output inductor 28 and its mutual inductance to the first inductor 25. If the coupling here is strong, the impedance at this frequency ($f_s$) is low.

Figure 5:
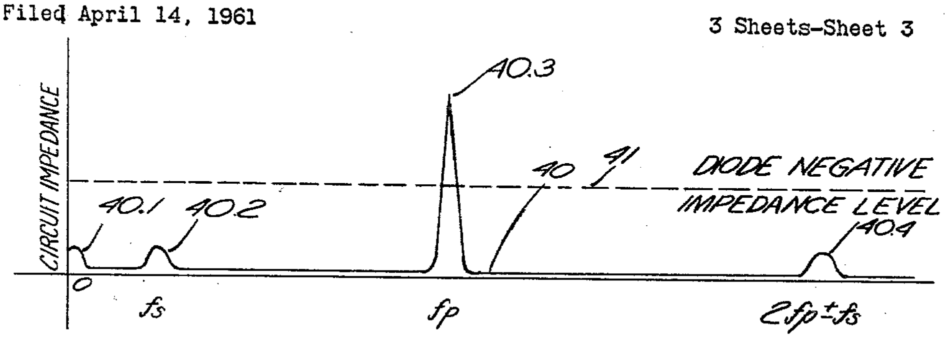
FIG. 5 is an impedance-versus-frequency graph to assist in explaining the invention.

Near $f_p$ another resonance occurs due to Loop I in the vicinity of point 40.3. There is only light circuit loading of Loop I in this network for this frequency, $f_p$, so that this resonance may be sharp and may exhibit a relatively high impedance, as is illustrated in FIG. 5. Still a third resonance will be found at one of the two frequencies $(2f_p\pm f_s)$, due to the input circuit and Loop III, in the vicinity of point 40.4. By coupling Loop III tightly or loosely to the input line 35, the impedance at the input frequency may be adjusted in magnitude.

The network of FIG. 3 is adjusted so that a high resonant circuit impedance will be found at the frequency $f_p$, and substantially lower resonant circuit impedances will occur at the other frequencies ($f_s$; $2f_p\pm f_s$) of resonance. If the negative impedance of the diode 20 has a magnitude which is intermediate in value between the impedance magnitude at $f_p$ (point 40.3) and the impedance magnitudes at the other frequencies (points 40.1, 40.2 and 40.4) as is illustrated by the dashed line 41 in FIG. 5, labelled "Diode Negative Impedance Level," then oscillations due to the negative impedance of the diode will occur only at $f_p$.

Thus, the network of FIG. 3 is a complex circuit having three separate resonance frequencies, $f_p$, $f_s$ and $(2f_p\pm f_s)$. $L_1$ is large enough to resonate with $C_2$ (and other circuit elements) at $f_s$. $L_2$ is smaller than $L_1$ and is dimensioned to resonate with the diode capacitance and $C_2$ (and other circuit elements) at $f_p$. The signal tank (Loop III) resonates at one of the frequencies $(2f_p\pm f_s)$. This network is loaded with the input line 35 and with the output line 27 so that it will not oscillate at $f_s$ or the input frequency; this is done by employing sufficiently tight coupling in each case to prevent oscillations, that is, to keep the impedance at the input and output frequencies at a low level, as shown in FIG. 5. At the same time, the loaded Q for the local oscillator frequency is maintained high, so that there will be high impedance and sharp resonance at $f_p$, and strong oscillations will occur at $f_p$.

The invention accordingly provides a frequency conversion system capable of oscillating at substantially a single frequency while simultaneously permitting the signal and intermediate frequencies to interact at the nonlinear resistance negative resistance device 20 in a stable manner.

Figure 4:
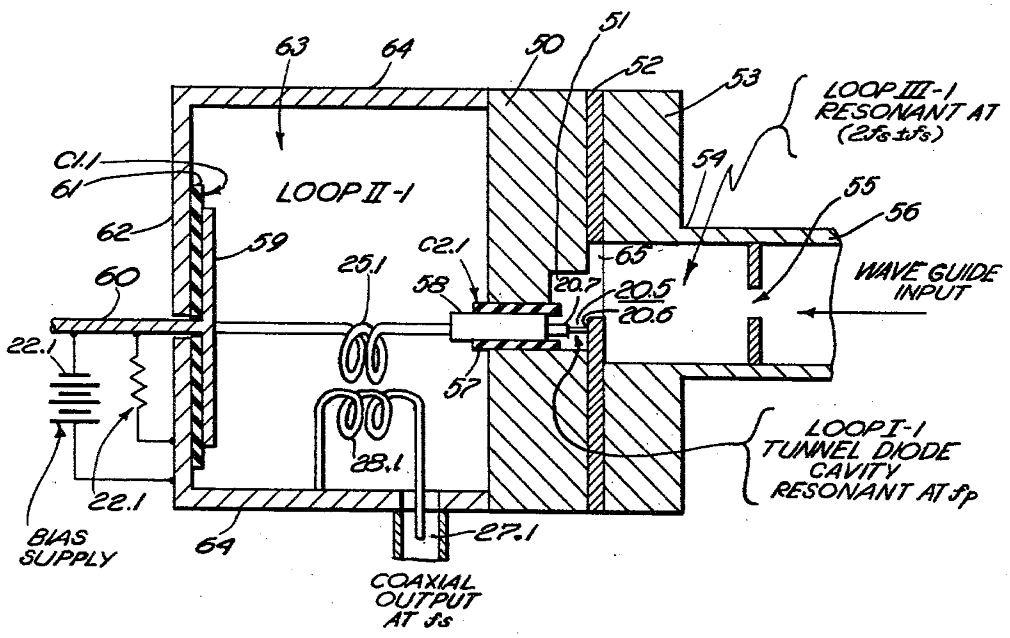
FIG. 4 represents, partially in section, another embodiment of the invention.

FIG. 4 shows a microwave embodiment of the system of FIG. 3. Loops I–1, II–1 and III–1, in FIG. 4, correspond to Loops I, II, III, respectively in FIG. 3. Loop I–1 is comprised of a cavity 51 in an electrically conductive plate 50, partially closed by a cover plate 52 of similar material, having an aperture 65 therethrough. The diode 20.5 is connected at one terminal 20.6 to a portion of the cover plate bounding the aperture 65 and extending across the cavity 51, and at the other terminal 20.7 to an electrical conductor terminal 58. Capacitor $C_{2.1}$, corresponding to capacitor $C_2$ (element 24) in FIG. 3, is comprised of this terminal 58, a sleeve 57 of insulator material, and material of the plate 50, which has a bore to receive the sleeve 57 and terminal 58. The distributed inductance of the cavity 51 (not identified in FIG. 4) corresponds to inductor $L_2$ (element 29) in FIG. 3.

Loop II–1 is constituted in FIG. 4 by the cavity 63, in the electrically conductive envelope of the plate 50, end wall 62 and side walls 64. Capacitor $C_{1.1}$, corresponding to the capacitor $C_1$ (element 23) in FIG. 3, is comprised of the end wall 62, a sheet of insulator material 61 and an electrically conductive plate 59. The distributed inductance of the cavity 63 (not identified in FIG. 4), together with a coil 25.1 connected between the diode terminal 58 and the plate 59, corresponds to the larger inductor $L_1$ (element 25) in FIG. 3. An extension 60 of the plate 59 passes through the end wall 62 of the cavity 63, and the bias battery 21.1 and shunt resistor 22.1 (if desired) are connected in parallel between this extension and the outer surface of the end wall 62. An output coupling coil 28.1 (corresponding to output inductor 28 in FIG. 3) is coupled to the inductor 25.1, and connected between the inner surface of the cavity wall 64 and a coaxial output signal line 27.1, adapted to transmit the intermediate frequency $f_s$.

The input signal of frequency $(2f_p\pm f_s)$ is introduced via a waveguide 56 of suitable dimensions for the frequency band containing this frequency. An iris element 55 marks one boundary of Loop III–1, which is otherwise bounded by the inner portion 54 of the input waveguide and the cover plate 52. Loop III–1 is coupled to Loop I–1 via the aperture 65 in the cover plate 52. As will be readily appreciated, the distributed inductance and capacitance of Loop II–1 correspond to elements 31, 32 and 33 of FIG. 3, and the distributed constants of the iris element 55 and aperture 65 in FIG. 4 correspond to the elements 31, 33, 34.1 and 34.2 of Loop III in FIG. 3. The configuration of FIG. 4 otherwise operates in the same manner as the system of FIG. 3.

Figures 6, 7, 8, 9, 10:
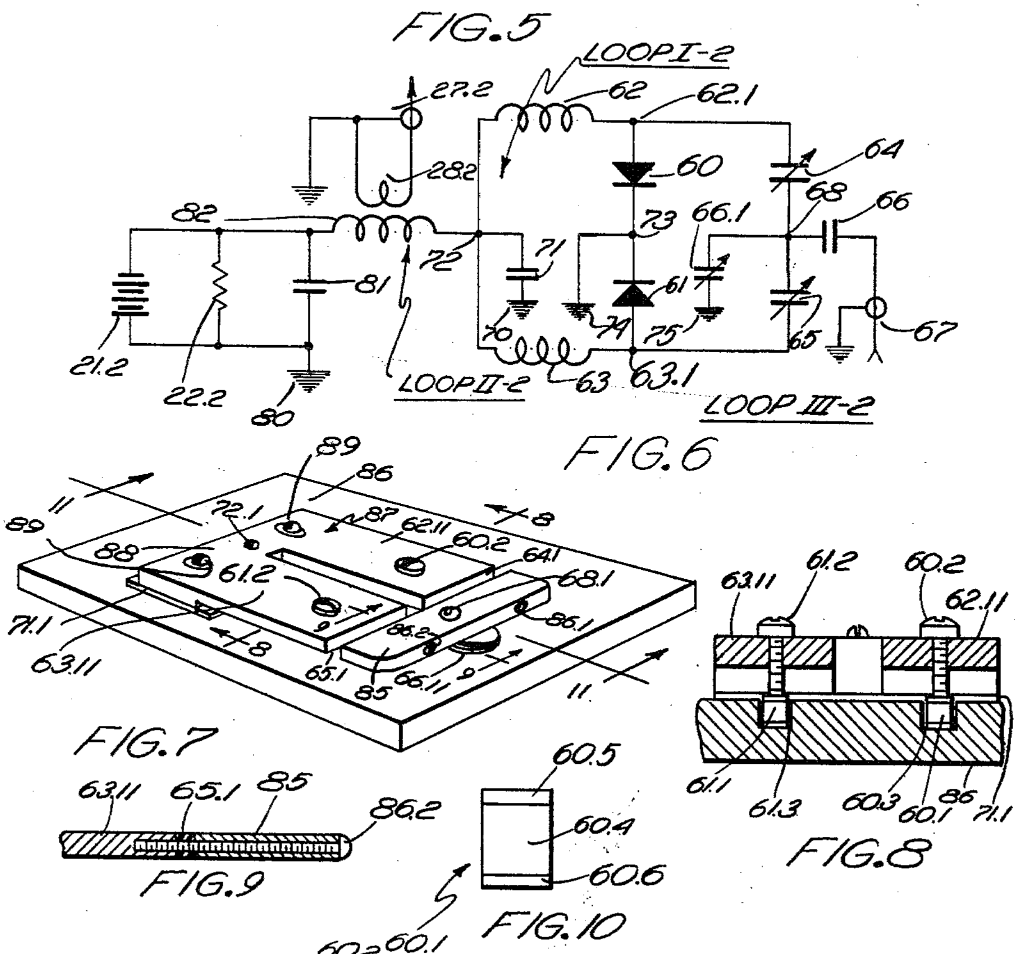
FIG. 6 is a circuit diagram showing another frequency conversion system according to the invention.
FIG. 7 is an isometric view of still another embodiment of the invention.
FIG. 8 is a section along line 8—8 of FIG. 7.
FIG. 9 is a partial section along line 9—9 of FIG. 7.
FIG. 10 is an enlarged outline view of an element shown in FIG. 8.
Figure 11:
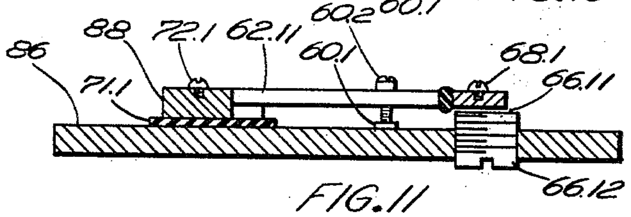
FIG. 11 is a section along line 11—11 of FIG. 7.

FIG. 6 shows a frequency conversion system employing a balanced pair of nonlinear resistance-negative resistance devices, here shown as tunnel diodes 60 and 61, in a local oscillator loop labelled "Loop I–2." Loop I–2 comprises two similar branches connected in parallel, each branch being traced from ground at 70 through a capacitor 71 to a first junction point 72 of two inductors 62 and 63. From the first junction point 72, one branch is traced through the first inductor 62 to the first diode 60, and through this diode to a second junction point 73 and the other branch is traced through the second inductor 63 to the second diode 61 to the second junction point 73. The second junction point is connected to ground at 74. The diodes are poled oppositely to each other with respect to the second junction point 73. The inductors 62 and 63 are in series, respectively with first and second variable capacitors 64 and 65, which are connected in series across the two diodes, from the junction 62.1, of the first inductor 62 and the first diode 60, to the junction 63.1, of the second inductor 63 and the second diode 61. The junction 68 of these two variable capacitors is connected via a third variable capacitor 66.1 to ground at 75. Push-pull oscillation, due to the negative resistance of the diodes is achieved in the resonant circuit involving the inductors 62, 63 and the variable capacitors 64, 65 in parallel with the diodes 60 and 61, respectively. The frequency of such oscillation may be adjusted to $f_p$ by varying the capacitors 64 and 65.

An input line 67 is coupled via an input coupling capacitor 66 to the junction 68 of the first and second variable capacitors 64 and 65, so that an input signal may be applied to the two diodes in shunt. The loop comprising the two parallel branches, through capacitor 64 and inductor 62, in shunt with capacitor 65 and inductor 63, through capacitor 71 to the common ground connection 70 and thence to signal line 67 and capacitor 66 is the input signal loop, labelled "Loop III–2," in FIG. 6.

The local oscillator loop I–2 and the input signal loop III–2 employ certain components in common. These two loops are functionally distinguished as follows. Signals associated with each loop consist of circulating currents. Currents for Loop I–2 traverse the inductors 62 and 63 in a series sense, such that voltages at junctions 62.1 and 63.1 have opposite phases. For the signal in Loop III–2 the current entering line 67 divides in parallel and traverses the inductors 62 and 63 in shunt, such that the voltages at junctions 62.1 and 63.1 have the same phase. Similar considerations apply to the variable capacitors 64 and 65.

By suitable adjustment of the three variable capacitors 64, 65 and 66.1, and choice of the magnitude of the coupling capacitor 66, the circuit impedance at the signal frequency ($2f_p \pm f_s$) can be made too low for oscillation because of strong coupling to the input signal line 67, in the manner described above in connection with FIG. 5.

An output signal loop, resonant at $f_s$ comprises the capacitor 71 from the junction point 72 of the Loop I–2 inductors 62, 63 to ground at 70, over to ground at 80 and thence to another capacitor 81 and return to the junction point 72 via an output inductor 82. This loop is labelled "Loop II–2" in FIG. 6, and corresponds to Loop II in FIG. 3. Parts of Loops II and II–2 correspond to each other as follows:

| Loop II | Loop II–2 |
|---|---|
| Capacitor 24. | Capacitor 71. |
| Inductor 25. | Inductor 82. |
| Capacitor 23. | Capacitor 81. |

An output coupling inductor 28.2 and output line 27.2 in FIG. 6 correspond, respectively, to the output coupling inductor 28 and output line 27 of FIG. 3. Similarly, the battery 21.2 and shunt resistor 22.2 shown in FIG. 6, correspond, respectively, to the bias supply 21 and shunt resistor 22 of FIG. 1. Adjustments of Loop II–2 and coupling between the output inductor 28.2 and Loop II–2 inductor may be made in the same manner as is described above with reference to FIGS. 3 and 5.

In the system shown in FIG. 6, the two diodes 60 and 61 can be relatively oriented as shown, or both may be reversed in polarity, in which case the polarity of the bias source 21.2 should also be reversed. Although the oscillation in Loop I–2 due to the negative resistance of the diodes is push-pull in mode, and the input signal is applied to the diodes in parallel, this system provides the appropriate phase conditions for mixing between the frequency bands (*a*) and (*d*) and (*a*) and (*e*), as shown in FIG. 2, since it satisfies the requirement that the incremental conductances ($\Delta g$) of the two diodes swing to positive and negative values in unison and it should be noted that this will occur in Loop II–2 in this system even though the voltages at the two diodes are in phase opposition. This is the result of the fact that the conductance of each diode has its maximum negative value at voltage value $V_b$ (FIG. 1) but swings toward a positive value if the voltage V is either increased or decreased from this point, $V_b$.

In the balanced system of FIG. 6 an additional desirable feature is achieved in that the local oscillation in Loop I–2, due to the negative resistance of the devices 60 and 61, is not coupled out to any degree either to the input line 67 or to the output line 27.2 provided that substantial equality exists between the capacitance values of the first and second variable capacitors 64 and 65, between the electrical characteristics of the two diodes 60 and 61, and between the inductance values of the two Loop I–2 inductors 62 and 63.

FIGS. 7 to 11, inclusive, illustrate structural details of a microwave embodiment of the system shown in FIG. 6. In these figures, only that portion of the system between the junctions 68 and 72 is shown. A base 86 which may be made of any electrically conductive material, such as a slab of copper or brass about ¼ inch thick, for example, constitutes a physical support for the other parts shown, and provides certain electrical functions, to be described. A U-shaped body 87 of electrically conductive material has two arms 62.11 and 63.11 connected at one end of each by a bight portion 88. The bight portion 88 is thicker than the arms and is fastened to the base 86, as by insulating screws or bolts 89 (which may be made of nylon or Teflon, for example, or of metal in an insulating sleeve), with a sheet of insulating material 71.1 between the base 86 and the bight portion 88. The arms 62.11 and 63.11 are held substantially parallel to and spaced from the base 86. A bar 85 of electrically conductive material is fastened, as by insulated bolts 86.1 and 86.2, to the free ends of the arms, 64.1 and 65.1 respectively, with insulating material (shown only in FIG. 9) intervening between the bar and each of said ends. A threaded stud 66.12 is mounted in and through the base 86 with an end confronting the lower mid side region of the bar 86, and may be spaced from the bar an adjustable distance 66.11.

Diodes 60.1 and 61.1 repose in wells 60.3 and 61.3, respectively, in the base 86, one diode beneath each of the arms 62.11 and 63.11, respectively, near the respective ends 64.1 and 65.1 thereof, and screw bolts 60.2 and 61.2 respectively, hold the diodes in place and made electrical contact thereto. Each diode is constructed as shown in outline in FIG. 10, which illustrates the first diode 60.1, as an example. This diode has a housing 60.4 made of an electrically nonconductive body (e.g., a ceramic) and electrically conductive terminals 60.5 and 60.6 at its ends. Thus, one of those terminals contacts the bottom of a well 60.3, for example, while the other contacts a screw bolt 60.2, whereby the diode is connected between the base 86 and an arm 62.11 of the U-shaped body 87.

Elements of FIG. 7 to 11, inclusive, correspond to the elements of FIG. 6 as follows:

| Figs. 7 to 11 | Fig. 6 |
|---|---|
| Screw 72.1. | Terminal 72. |
| Insulator 71.1 and confronting surfaces of bight 88 and base 86. | Capacitor 71. |
| Arms 62.11 and 63.11. | Inductors 62 and 63, respectively. |
| Diodes 60.1 and 61.1. | Diodes 60 and 61, respectively. |
| Ends 64.1 and 65.1 with confronting face of bar 85. | Capacitors 64 and 65, respectively. |
| Space 66.11 and bounding surfaces of bar 85 and stud 66.12. | Capacitor 66.1. |
| Screw 68.1. | Terminal 68. |
| Contact screws 60.2 and 61.2. | Junction points 62.1, 63.1, respectively. |

The junction point 73 of the two diodes in FIG. 6 finds a corresponding element in the region of the base 86 (see FIG. 8) to which the diodes are joined at the bottoms of the wells 60.3 and 61.3. The base 86 provides a common ground corresponding to the ground 70, 74 and 75 shown in FIG. 6. It will be appreciated that the arms 62.11 and 63.11 have distributed inductance, and that the capacitor spaces at the ends of the arms 64.1 and 65.1 can be adjusted via the screw bolts 86.1 and 86.2, respectively.

It is thus apparent that FIGS. 7 to 11 illustrate a circuit corresponding to Loop I–2 and portions of Loop III–2 of FIG. 6 realized in a structure suitable for use at microwave frequencies. An input circuit corresponding to that of Loop III–2 may be coupled to FIG. 7 at terminal 68.1. An output circuit corresponding to Loop II–2 of FIG. 6 may be coupled to FIG. 7 at terminal 72.1. A bias source and if desired a shunt resistor, corresponding respectively to elements 21.2 and 22.2 of FIG. 6 may also be mounted on the base 86, preferably at the left-hand end as shown in FIG. 7.

The embodiments of the invention which have been illustrated and described herein are but a few illustrations of the invention. Other alternative circuit arrangements may be made within the scope of this invention by those skilled in the art. For example, the input or output lines might alternately be coupled by capacitors to the diode circuit instead of by mutual inductance as shown in some of the figures. Another alternative, for example, to the balanced circuit of FIG. 6 would involve coupling the input lines to a push-pull mode of the circuit and allowing the circuit to oscillate with the two diodes in phase. Such variations by those skilled in the art are to be considered as obvious adaptations of this basic invention. No attempt has been made to illustrate all possible embodiments of the invention, but rather only to illustrate its principles and the best manner presently known to practice it. Therefore, while certain specific embodiments have been described as illustrative of the invention, such other forms as would occur to one skilled in this art on a reading of the foregoing specification are also within the spirit and scope of the invention, and it is intended that this invention includes all modifications and equivalents which fall within the scope of the appended claims.

What is claimed is:

1. Frequency converting system for electric waves comprising a nonlinear resistance device having a current-versus-voltage characteristic which includes a negative resistance portion between two positive resistance portions, a network having at least three loops resonant respectively to first, second and third resonance frequencies, $f_1$, $f_2$ and $f_3$, respectively, where $f_1>f_2$, and $f_3=(2f_1 \pm f_2)$, a first of said loops including said device, and means to bias said device for static operation substantially in the midregion of said negative resistance portion of said current-versus-voltage characteristic.

2. Frequency converting system for electric waves comprising a nonlinear resistance diode having a current-versus-voltage characteristic which includes a negative resistance portion between two positive resistance portions, a network having at least three loops resonant respectively to first, second and third, resonance frequencies, $f_1$, $f_2$ and $f_3$, respectively, where $f_1>f_2$, and $f_3=(2f_1 \pm f_2)$ a first of said loops including said diode, and means to bias said diode for static operation substantially in the mid region of said negative resistance portion of said current-versus-voltage characteristic.

3. Frequency converting system for electric waves in the microwave region comprising a nonlinear resistance device having a current-versus-voltage characteristic which includes a negative resistance portion between two positive resistance portions, a network having at least three loops resonant respectively to first, second and third resonance frequencies, $f_1$, $f_2$ and $f_3$, respectively, where $f_1>f_2$, and $f_3=(2f_1 \pm f_2)$, a first of said loops comprising a first cavity resonator including said device and having inductance and capacitance proportioned relative to the remainder of said network and to the reactive characteristics of said device so that said first loop is adapted to resonate at said first frequency, a second of said loops comprising a second resonator coupled to said first cavity resonator and having inductance and capacitance proportioned relative to the remainder of said network so that said second loop is adapted to resonate at said second frequency, a third of said loops comprising a third cavity resonator coupled to said first cavity resonator and having inductance and capacitance proportioned relative to the remainder of said network so that said third loop is adapted to resonate at said third frequency, and means to bias said device for static operation substantially in the mid region of said negative resistance portion of said current-versus-voltage characteristic.

4. Frequency converting system for electric waves comprising two similar nonlinear resistance devices each having a current-versus-voltage characteristic which includes a negative resistance portion between two positive resistance portions, a network having at least three loops resonant respectively to first, second and third resonance frequencies, $f_1$, $f_2$, and $f_3$, respectively, where $f_1>f_2$, and $f_3=(2f_1 \pm f_2)$, a first of said loops including said devices connected in mutual opposition, and means to bias said devices for static operation substantially in the mid region of said negative resistance portion of said current-versus-voltage characteristic of each of said devices.

5. Frequency converting system for electric waves comprising two similar nonlinear resistance devices each having a current-versus-voltage characteristic which includes a negative resistance portion between two positive resistance portions, a network having at least three loops, resonant respectively to first, second and third resonance frequencies, $f_1$, $f_2$ and $f_3$, respectively, where $f_1>f_2$, and $f_3=(2f_1 \pm f_2)$, a first of said loops including said devices connected in mutual opposition, said first loop comprising a base having an electrically conductive flat surface, a substantially U-shaped electrically conductive body mounted at its bight portion to said base and spaced therefrom by an insulator, the arms of said body extending parallel to and spaced from said surface and bridged at their free ends by an electrical conductor, said conductor being spaced from said free ends whereby to form a capacitor with each free end, each arm constituting an inductor in series with the capacitor so formed at its free end, first terminal means for coupling a portion of said second loop to said electrical conductor, second terminal means to couple said third loop to said bight portion, and means to bias said devices for static operation substantially in the mid region of said negative resistance portion of said current-versus-voltage characteristic of each of said devices.

(References on following page)

References Cited by the Examiner

UNITED STATES PATENTS

| | | | |
|---|---|---|---|
| 2,710,346 | 6/55 | Schmitt | 325—445 |
| 2,841,703 | 7/58 | Bopp et al. | 325—319 |
| 2,958,833 | 11/60 | Vonbun et al. | 333—83 |
| 2,962,586 | 11/60 | Maurer | 325—445 |
| 2,978,576 | 4/61 | Watters | 325—443 |
| 2,998,582 | 8/61 | Riblet | 333—83 |

DAVID G. REDINBAUGH, *Primary Examiner.*

SAMUEL B. PRITCHARD, *Examiner.*